United States Patent Office 3,246,974
Patented Apr. 19, 1966

3,246,974
METHOD OF CONTROLLING WATER GRASS
Mervin E. Brokke, Richmond, Calif., and Chester L. Dewald, Houston, Tex., assignors to Stauffer Chemical Company, New York, N.Y., a corporation of Delaware
No Drawing. Filed Jan. 16, 1963, Ser. No. 251,738
1 Claim. (Cl. 71—2.6)

This invention relates to the use of certain compositions of matter as herbicides. More specifically, the present invention regards the use of compounds of the general formula:

$$R-SO_2NH-R^1$$

wherein R is a para-lower alkylphenyl or p-lower alkoxyphenyl radical and R' is a cyclohexyl, phenyl or a substituted phenyl radical wherein said substituent is selected from the group consisting of halogen, lower alkyl, lower alkoxy and mixtures thereof. By lower alkyl and alkoxy is meant such radicals containing from one to five carbon atoms.

The compounds of the present invention and the method of preparing them are old and well known in the art and thus only their use as a herbicide is held to be new and novel.

One method of preparing the compounds of the present invention is to mix an appropriately substituted benzene sulfonyl chloride with an appropriately substituted aniline in the presence of pyridine. A water solution of base, such as sodium hydroxide or the like may be substituted for the solvent pyridine as this also readily picks up the liberated HCl from the reaction and leaves the desired compound.

The compounds of the present invention have been extensively tested both as pre-emergence herbicides and post-emergence herbicides with excellent results. Pre-emergence herbicides are applied to a potential weed habitat either before or after seeding but before the crop emerges. If the herbicide is harmless to the desired crop, seeds or seedlings, but phytotoxic to weed seeds or seedlings encountered, the crop grows in a weed-free environment. Post-emergence herbicides are applied after the crop and/or weeds emerge from the soil and likewise must be harmless to the desired crop and phytotoxic with respect to the weeds encountered.

The phytotoxic compositions of the present invention may be applied to the weed habitat in any of the convenient forms well known to those skilled in the art. For instance, it can be dissolved in a solvent, such as acetone, or emulsified and sprayed onto the weed habitat; or it can be combined with a dry inert carrier and applied as a dust or as granules. The rates of application may vary widely depending on the results desired.

The phytotoxicity of the compounds of the present invention is shown by the results of the following testing methods.

Example 1

Seeds of water grass are planted in rows one-half inch deep in Santa Cruz sandy loam soil contained in 8″ x 12″ metal flats which are 2¾″ deep. The flats are watered after planting and the following day each flat is sprayed at rate of 20 pounds of the compound under test in 80 gallons of solution per acre. A No. 152 DeVilbiss atomizer is used to spray the solution on the soil surface. Two weeks later the degree of weed control is determined by comparing the amount of germination and growth of each weed in the treated flats with the weeds in several untreated control flats.

The following chart shows the results of the test described supra.

$$R-SO_2NH-R^1$$

| Compound No. | R | R¹ | Pre-emergence Water Grass Activity |
|---|---|---|---|
| 1 | 4-methylphenyl | Cyclohexyl | XX |
| 2 | do | 2-methoxyphenyl | XXX |
| 3 | do | 2-fluorophenyl | X |
| 4 | do | 4-methoxyphenyl | XX |
| 5 | do | 2,4-dimethylphenyl | XX |
| 6 | do | x,x-dimethylphenyl | XX |
| 7 | do | 2-methyl-5-i-propylphenyl | X |
| 8 | do | 2-ethylphenyl | XX |
| 9 | do | 2-chlorophenyl | XXX |
| 10 | do | 2-methylphenyl | XXX |
| 11 | do | Phenyl | XXX |
| 12 | do | 2-methyl-3-chlorophenyl | XXX |
| 13 | do | 3-methylphenyl | XXX |
| 14 | do | 4-fluorophenyl | XXX |
| 15 | 4-methoxyphenyl | 3-methylphenyl | XXX |
| 16 | do | 4-methylphenyl | XX |
| 17 | do | 2,4-dimethylphenyl | XX |
| 18 | do | 2,6-dimethylphenyl | XX |
| 19 | do | 2-methylphenyl | XXX |
| 20 | 4-ethylphenyl | 2-methoxyphenyl | XXX |
| 21 | do | 2-methylphenyl | XXX |
| 22 | do | 2-ethylphenyl | XXX |
| 23 | 4-methylphenyl | 2-chloro-4-nitrophenyl | XX |

X indicates partial control.
XX indicates good control.
XXX indicates complete control.

Example 2

Seeds of water grass and rice were planted in Santa Cruz sandy loam soil contained in metal containers, as in Example 1. After growing for two weeks under greenhouse conditions the plants were four to six inches tall. The foliage was then sprayed using a DeVilbiss sprayer. This spray treatment was equivalent to a rate of 10 lbs. in 80 gallons of solution/acre. Two weeks after treatment the injury results to the water grass was recorded and are reported below. The rice was unaffected by the treatment.

$$R-SO_2NH-R^1$$

| Compound No. | R | R¹ | Post-emergence Water Grass Activity |
|---|---|---|---|
| 1 | 4-methylphenyl | Cyclohexyl | XX |
| 2 | do | 2-methoxyphenyl | XXX |
| 3 | do | 2-fluorophenyl | XXX |
| 4 | do | 4-methoxyphenyl | X |
| 5 | do | 2,4-dimethylphenyl | XXX |
| 6 | do | x,x-dimethylphenyl | XXX |
| 7 | do | 2-methyl-5-i-propylphenyl | XXX |
| 8 | do | 2-ethylphenyl | XXX |
| 9 | do | 2-chlorophenyl | XXX |
| 10 | do | 2-methylphenyl | XXX |
| 11 | do | Phenyl | X |
| 12 | do | 2-methyl-3-chlorophenyl | XX |
| 13 | do | 3-methylphenyl | X |
| 14 | do | 4-fluorophenyl | XXX |
| 15 | 4-methoxyphenyl | 3-methylphenyl | XXX |
| 16 | do | 4-methylphenyl | XX |
| 17 | do | 2,4-dimethylphenyl | XX |
| 18 | do | 2,6-dimethylphenyl | X |
| 19 | do | 2-methylphenyl | XXX |
| 20 | 4-ethylphenyl | 2-methoxyphenyl | XXX |
| 21 | do | 2-methylphenyl | XXX |
| 22 | do | 2-ethylphenyl | XXX |
| 24 | 4-methylphenyl | 2-methoxy-5-chlorophenyl | XX |
| 25 | 4-methoxyphenyl | 2-fluorophenyl | XXX |

X indicates partial control.
XX indicates good control.
XXX indicates complete control.

We claim:
The method of controlling water grass comprising applying to said grass habitat a phytotoxic amount of a compound of the formula:

$$R-SO_2NH-R^1$$

wherein R is a radical selected from the group consisting of para-lower alkylphenyl and para-lower alkoxyphenyl and $R^1$ is a radical selected from the group consisting of cyclohexyl, phenyl and substituted phenyl wherein said substituent is selected from the group consisting of halogen, lower alkyl and lower alkoxy.

References Cited by the Examiner

UNITED STATES PATENTS

| | | | |
|---|---|---|---|
| 2,964,538 | 12/1960 | Kundiger et al. | 71—2.6 X |
| 3,046,104 | 7/1962 | Ehlers | 71—2 |

FOREIGN PATENTS 823,970  12/1951  Germany.

OTHER REFERENCES

Fromm et al., Chemical Abstracts, vol. 46, col. 8315(g), 1952.

Tsyganov et al., Chemical Abstracts, vol. 41, col. 5687(e), 1947.

LEWIS GOTTS, *Primary Examiner*.